(12) United States Patent
Bovio et al.

(10) Patent No.: US 7,310,222 B2
(45) Date of Patent: Dec. 18, 2007

(54) FLAT-PANEL DISPLAY MOUNTING SYSTEM FOR PORTABLE COMPUTER

(75) Inventors: Michele Bovio, Boston, MA (US); Robert C. Frame, Westboro, MA (US)

(73) Assignee: Chunghwa Picture Tubes, Ltd., Taipei (TW)

( * ) Notice: Subject to any disclaimer, the term of this patent is extended or adjusted under 35 U.S.C. 154(b) by 0 days.

(21) Appl. No.: 11/007,718

(22) Filed: Dec. 6, 2004

(65) Prior Publication Data

US 2005/0082961 A1    Apr. 21, 2005

Related U.S. Application Data

(63) Continuation of application No. 08/822,438, filed on Mar. 21, 1997, now Pat. No. 6,838,810.

(51) Int. Cl.
*H05K 5/00* (2006.01)
*G02F 1/1333* (2006.01)
*A47F 5/12* (2006.01)

(52) U.S. Cl. .................. 361/681; 345/905; 248/923; 349/58; 362/632; 211/169

(58) Field of Classification Search ............... 361/681; 345/905; 248/917, 919–924; 349/58, 59, 349/60; 362/632–634; 211/169
See application file for complete search history.

(56) References Cited

U.S. PATENT DOCUMENTS 4,111,533 A    9/1978  Nakamura et al.
4,165,607 A    8/1979  Fedorowicz et al.
4,184,194 A    1/1980  Shofu
4,202,607 A    5/1980  Washizuka et al.

(Continued)

FOREIGN PATENT DOCUMENTS

DE          41 20 950          12/1992

(Continued)

OTHER PUBLICATIONS

Advanced Display Inc. "14.2 XGA (Ver.2) Technical Data, AA142XB11," Feb. 1997.

(Continued)

*Primary Examiner*—Jayprakash Gandhi
*Assistant Examiner*—Zachary M Pape
(74) *Attorney, Agent, or Firm*—J.C. Patents

(57) ABSTRACT

A flat-panel display with fixtures in its sidewalls to enable support by lateral mounting members is disclosed. The advantage of this approach, in which the fixtures are essentially rotated around to the sides of the flat-panel display, is the reduction in the portion of the portable computer's top cover that is not the active display. In practice, this results in an increase in the size of the display that may be housed in the same-sized top cover. In order to accommodate the lateral mounting of the flat-panel display, metal brackets are used. These brackets extend from the base unit hinges and cradle the display. This adds torsional rigidity, but also removes the requirement that the back must be structural. Further reductions in the inactive portions of the top cover may be achieved by extending the ends of the display's fluorescent back-light beyond or through the metal rim that surrounds the display.

18 Claims, 3 Drawing Sheets

U.S. PATENT DOCUMENTS

| | | |
|---|---|---|
| 4,422,728 A | 12/1983 | Andreaggi |
| 4,438,458 A | 3/1984 | Munscher |
| 4,616,295 A | 10/1986 | Jewell et al. |
| 4,652,932 A | 3/1987 | Miyajima et al. |
| 4,727,285 A | 2/1988 | Taniguchi |
| 4,747,672 A | 5/1988 | Yasuhara et al. |
| 4,755,035 A | 7/1988 | Kopish et al. |
| 4,772,100 A | 9/1988 | Suenaga |
| 4,781,422 A | 11/1988 | Kimble |
| 4,796,977 A | 1/1989 | Drake |
| 4,809,078 A | 2/1989 | Yabe et al. |
| 4,832,419 A | 5/1989 | Mitchell et al. |
| 4,937,709 A | 6/1990 | Yanagi et al. |
| 4,959,887 A | 10/1990 | Gruenberg et al. |
| 4,960,256 A | 10/1990 | Chihara et al. |
| 5,002,368 A | 3/1991 | Anglin |
| 5,102,084 A | 4/1992 | Park |
| 5,103,377 A | 4/1992 | Kobayashi et al. |
| 5,107,401 A | 4/1992 | Youn |
| 5,119,204 A | 6/1992 | Hashimoto et al. |
| 5,138,523 A | 8/1992 | Benck et al. |
| 5,146,354 A | 9/1992 | Plesinger |
| 5,168,426 A | 12/1992 | Hoving et al. |
| 5,173,837 A | 12/1992 | Blackwell et al. |
| 5,195,213 A | 3/1993 | Ohgami et al. |
| 5,216,411 A | 6/1993 | Ashitomi et al. |
| 5,229,920 A | 7/1993 | Spaniol et al. |
| 5,233,502 A | 8/1993 | Beatty et al. |
| 5,237,486 A | 8/1993 | LaPointe et al. |
| 5,238,421 A | 8/1993 | Kobayashi |
| 5,264,992 A | 11/1993 | Hogdahl et al. |
| 5,267,123 A | 11/1993 | Boothroyd et al. |
| 5,268,817 A | 12/1993 | Miyagawa et al. |
| 5,274,486 A | 12/1993 | Yamazaki et al. |
| 5,276,589 A | 1/1994 | Bartlett et al. |
| 5,280,372 A | 1/1994 | Horiuchi |
| 5,293,300 A | 3/1994 | Leung |
| 5,297,003 A | 3/1994 | Nomura et al. |
| 5,313,318 A | 5/1994 | Gruenberg et al. |
| 5,316,491 A | 5/1994 | Satou et al. |
| 5,328,379 A | 7/1994 | Kobayashi |
| 5,335,100 A | 8/1994 | Obata |
| 5,335,142 A | 8/1994 | Anderson |
| 5,341,231 A | 8/1994 | Yamamoto et al. |
| 5,363,227 A | 11/1994 | Ichikawa et al. |
| 5,375,005 A | 12/1994 | Komano |
| 5,379,182 A * | 1/1995 | Fujimori et al. ............ 361/681 |
| 5,422,751 A | 6/1995 | Lewis et al. |
| 5,432,626 A | 7/1995 | Sasuga et al. |
| 5,436,745 A | 7/1995 | Voisin et al. |
| 5,436,792 A | 7/1995 | Leman et al. |
| 5,438,475 A | 8/1995 | Bradley |
| 5,450,221 A | 9/1995 | Owen et al. |
| 5,467,085 A | 11/1995 | Dunn |
| 5,467,106 A | 11/1995 | Salomon |
| 5,467,504 A | 11/1995 | Yang |
| 5,469,327 A | 11/1995 | Cheng |
| 5,477,423 A | 12/1995 | Fredriksz et al. |
| 5,479,285 A | 12/1995 | Burke |
| 5,486,942 A | 1/1996 | Ichikawa et al. |
| 5,494,447 A | 2/1996 | Zaidan |
| 5,496,061 A | 3/1996 | Brown |
| 5,497,296 A | 3/1996 | Satou et al. |
| 5,504,605 A | 4/1996 | Sakuma et al. |
| 5,559,670 A | 9/1996 | Flint et al. |
| 5,566,048 A | 10/1996 | Esterberg et al. |
| 5,568,357 A | 10/1996 | Kochis et al. |
| 5,570,267 A | 10/1996 | Ma |
| 5,583,529 A | 12/1996 | Satou |
| 5,594,574 A | 1/1997 | Lara et al. |
| 5,619,351 A | 4/1997 | Funamoto et al. |
| 5,634,351 A | 6/1997 | Larson et al. |
| 5,636,101 A | 6/1997 | Bonsall et al. |
| 5,636,102 A | 6/1997 | Fujino et al. |
| 5,644,516 A | 7/1997 | Podwalny et al. |
| 5,654,779 A | 8/1997 | Nakayama et al. |
| 5,666,172 A | 9/1997 | Ida et al. |
| 5,680,183 A | 10/1997 | Sasuga et al. |
| 5,682,645 A | 11/1997 | Watabe et al. |
| 5,717,566 A | 2/1998 | Tao |
| 5,771,539 A | 6/1998 | Wahlstedt et al. |
| 5,777,704 A | 7/1998 | Selker |
| 5,815,224 A | 9/1998 | Hasegawa et al. |
| 5,815,225 A | 9/1998 | Nelson |
| 5,835,139 A | 11/1998 | Yun et al. |
| 5,844,774 A | 12/1998 | Gushiken et al. |
| 5,872,606 A | 2/1999 | Kim |
| 5,905,550 A | 5/1999 | Ohgami et al. |
| 5,926,237 A | 7/1999 | Yun et al. |
| 6,002,457 A | 12/1999 | Yun et al. |
| 6,020,942 A | 2/2000 | Yun et al. |
| 6,373,537 B2 | 4/2002 | Yun et al. |
| 2002/0080299 A1 | 6/2002 | Yun et al. |

FOREIGN PATENT DOCUMENTS

| | | |
|---|---|---|
| EP | 0 317 261 | 5/1989 |
| EP | 0 425 793 | 9/1991 |
| EP | 0 454 120 | 10/1991 |
| EP | 0 532 284 | 3/1993 |
| EP | 0 604 872 | 7/1994 |
| GB | 2 305 689 | 4/1997 |
| GB | 2 305 690 | 4/1997 |
| JP | 59-020273 | 2/1984 |
| JP | 62-137479 | 8/1987 |
| JP | 62-269931 | 11/1987 |
| JP | 01-59223 | 4/1989 |
| JP | 01-094983 | 4/1989 |
| JP | 01-211721 | 8/1989 |
| JP | 01-237591 | 9/1989 |
| JP | 02-79893 | 3/1990 |
| JP | 02-083573 | 6/1990 |
| JP | 02-244190 | 9/1990 |
| JP | 03-006670 | 1/1991 |
| JP | 03-156488 | 7/1991 |
| JP | 04-020086 | 2/1992 |
| JP | 04-051595 | 2/1992 |
| JP | 05-042853 | 2/1993 |
| JP | 05-50428 | 2/1993 |
| JP | 05-080334 | 4/1993 |
| JP | 06-19381 | 3/1994 |
| JP | 06-021018 | 3/1994 |
| JP | 3001011 | 6/1994 |
| JP | 6-313884 | 11/1994 |
| JP | 06-348364 | 12/1994 |
| JP | 07-099394 | 4/1995 |
| JP | 07-199180 | 8/1995 |
| JP | 07-261187 | 10/1995 |
| JP | 07-281184 | 10/1995 |
| JP | 07-044577 | 11/1995 |
| JP | 07-044579 | 11/1995 |
| JP | 08-211964 | 8/1996 |
| JP | 52-045367 | 4/1997 |
| JP | 09-146466 | 6/1997 |
| JP | 09-199875 | 7/1997 |
| JP | 09-297542 | 11/1997 |
| JP | 10-301095 | 11/1998 |

OTHER PUBLICATIONS

Declaration of Robert C. Frame, dated Feb. 24, 2004, pp. 1-14.
Declaration of Michele B. Bovio, dated Feb. 28, 2004, pp. 1-9.
IBM Technical Disclosure Bulletin, vol. 33, No. 9 § 261-262 "High Efficiency Back Light for LCD," Feb. 1991.

IBM Technical Disclosure Bulletin, vol. 37, No. 12 "Cell Support Assembly without Screw," Dec. 1994.

IBM Technical Disclosure Bulletin, vol. 39, No. 01. §71-73 "Structure Design for Liquid Crystal Display Module," Jan. 1996.

Kawamoto et al., "Color-Liquid-Crystal Display for Automotive Instrument Panel," Toshiba Review, Dec. 1984, 1071-1074.

"Nikkei Microdevice Special Issue Flat Panel Display 1997" (Dec. 20, 1996) p. 49, Nikkei BP.

Syroid et al., "A High Performance 4×4 inch AMLCD for Avionic Applications", SPIE—The International Society for Optical Engineering vol. 2734, pp. 240-247, Jul. 1996.

Wood, "Honeywell militarized color liquid displays for the F-16", SPIE—The International Society for Optical Engineering vol. 2734, pp. 108-118, Jul. 1996.

"Society for Information Display, International Symposium, Digest of Technical Papers," vol. XXIII, May 1992, 21 pages.

Honeywell Component Maintenance Manual, Display Unit/Part No. 4073610, 2 pages, 1996.

Toshiba Liquid Crystal Display Division Products Information, 35cm Color TFT Module (13.8 Type) LTM14C015, 8 pages.

European Search Report dated Jan. 15, 2001.

Declaration of Dong Sun Lee in Support of Opposition to CPT's Motion for Summary Judgment on Plaintiff's Side-Mount Patent Infringement Claims for Lack of Standing dated Jul. 21, 2004.

Declaration of Dug Hyun Hwang in Support of Opposition to CPT's Motion for Summary Judgment of Plaintiff's Side-Mount Patent Infringement Claims for Lack of Standing dated Jul. 21, 2004.

Declaration of Gi Ho Cho in Support of Opposition to CPT's Motion for Summary Judgment of Plaintiff's Side-Mount Patent Infringement Claims for Lack of Standing dated Jul. 20, 2004.

Declaration of Jin Kwan Choi in Support of Opposition to CPT's Motion for Summary Judgment on Plaintiff's Side-Mount Patent Infringement Claims for Lack of Standing dated Jul. 20, 2004.

Declaration of Sang Hoon Lee in Support of Opposition to CPT's Motion for Summary Judgment on Plaintiff's Side-Mount Patent Infringement Claims for Lack of Standing dated Jul. 22, 2004.

Declaration of Woo Yeol Kim in Support of Opposition to CPT's Motion for Summary Judgment on Plaintiff's Side-Mount Patent Infringement Claims for Lack of Standing dated Jul. 21, 2004.

Declaration of Young Un Bang in Support of Opposition to CPT's Motion for Summary Judgment on Plaintiff's Side-Mount Patent Infringement Claims for Lack of Standing dated Jul. 20, 2004.

Declaration of Yong Bum Kim in Support of Opposition to CPT's Motion for Summary Judgment on Plaintiff's Side-Mount Patent Infringement Claims for Lack of Standing dated Jul. 20, 2004.

Declaration of Howard C. Rile, Jr. in Support of Opposition to CPT's Motion for Summary Judgment on Plaintiff's Side-Mount Patent Infringement Claims for Lack of Standing dated Jul. 22, 2004.

Supplemental Declaration of Michele B. Bovio dated Jun. 17, 2004 with Exhibits A-N.

LPL's Complaint dated Aug. 29, 2002, filed in *LG Electronics Inc. and LG. Philips* v. *Chunghwa Picture Tubes Ltd et AL.*, U.S. District Court for the Central District of California, Related Case Nos. CV-02-6775, CV-03-2866CBM, CV-03-2884CBM, CV-03-2885CBM and CV-03-2886CBM.

CPT's Answer and Counterclaims dated Dec. 20, 2002, filed in *LG Electronics Inc. and LG. Philips* v. *Chunghwa Picture Tubes Ltd et AL.*, U.S. District Court for the Central District of California, Related Case Nos. CV-02-6775, CV-03-2866CBM, CV-03-2884CBM, CV-03-2885CBM and CV-03-2886CBM.

LPL's Reply to CPT's Counterclaims dated Jan. 10, 2003, filed in *LG Electronics Inc. and LG. Philips* v. *Chunghwa Picture Tubes Ltd et AL.*, U.S. District Court for the Central District of California, Related Case Nos. CV-02-6775, CV-03-2866CBM, CV-03-2884CBM, CV-03-2885CBM and CV-03-2886CBM.

LPL's Second Amended or Supplemental Complaint dated Nov. 14, 2005 filed in *LG Electronics Inc. and LG. Philips* v. *Chunghwa Picture Tubes Ltd et AL.*, U.S. District Court for the Central District of California, Related Case Nos. CV-02-6775, CV-03-2866CBM, CV-03-2884CBM, CV-03-2885CBM and CV-03-2886CBM.

CPT's Answer to LPL's Second Amended or Supplemental complaint and Counterclaims dated Mar. 28, 2006, filed in *LG Electronics Inc. and LG. Philips* v. *Chunghwa Picture Tubes Ltd et AL.*, U.S. District Court for the Central District of California, Related Case Nos. CV-02-6775, CV-03-2866CBM, CV-03-2884CBM, CV-03-2885CBM and CV-03-2886CBM.

LPL's Reply to CPT's Counterclaims dated Apr. 20, 2006, filed in *LG Electronics Inc. and LG. Philips* v. *Chunghwa Picture Tubes Ltd et AL.*, U.S. District Court for the Central District of California, Related Case Nos. CV-02-6775, CV-03-2866CBM, CV-03-2884CBM, CV-03-2885CBM and CV-03-2886CBM.

LPL's Answer and Counterclaims dated Apr. 25, 2005, filed in *CPT* v. *LG. Philips LCD*, U.S. District Court for the Central District of California, CV-05-0189CBM (JTLx).

LPL's Amended Answer and Counterclaims dated May 15, 2006, lodged in *CPT* v. *LG. Philips LCD*, U.S. District Court for the Central District of California, CV-05-0189CBM (JTLx).

Chunghwa Picture Tubes, Ltd. Preliminary Claim Constructions dated Jul. 17, 2006, filed in *Chunghwa Picture Tubes, Ltd.*, v. *LG Electronics, Inc. and LG. Philips LCD Co., Ltd.*, U.S. District Court for the Central District of California, CV-05-0189CBM (JTL).

LG. Philips LCD Co., LTD'S Proposed Claim Constructions dated Jul. 17, 2006, filed in *Chunghwa Picture Tubes, Ltd.*, v. *LG Electronics, Inc. and LG. Philips LCD Co., Ltd.*, U.S. District Court for the Central District of California, CV-05-0189CBM (JTL).

Award of Arbitrators dated Jun. 2006 In the Matter of the Arbitration between *Chunghwa Picture Tubes, Ltd.* ("*CPT*") vs *LG Electronics Inc.* ("*LGE*") *and LG. Philips LCD Co., Ltd.* ("*LPL*") (50 133 T 00379 04) (19 total pages).

\* cited by examiner

FLAT-PANEL DISPLAY MOUNTING SYSTEM FOR PORTABLE COMPUTER

CROSS-REFERENCE TO RELATED APPLICATION

This application is a continuation of application Ser. No. 08/822,438, filed Mar. 21, 1997, now U.S. Pat. No. 6,838,810 dated Jan. 4, 2005.

BACKGROUND OF THE INVENTION

Portable computers almost universally have a top cover that pivots to open or close over a base unit. The top cover typically houses a flat-panel display, and the base unit has a keyboard and, many times, some form of pointing device.

In most cases, the flat-panel display is supported in the top cover by securing it to a plastic back or rear portion of the top cover. Usually, the flat-panel display has four or more holes around its periphery; bolts extend orthogonally to the face of the display, through the holes, to engage bosses, which are integral with the back. The plastic back is typically structural in nature, being manufactured from a rigid plastic. When connected together, the flat-panel display and the plastic back provide necessary rigidity to the top cover.

The selection of the flat-panel display in portable computers is generally driven by two competing concerns. On one hand, with the availability of ever-larger flat-panel displays, there is a desire to incorporate those displays into newer portable computer designs. Running contrary to this, however, is the desire to limit the overall dimensions of the computers to enhance their portability. For example, it is common to design portable computers with outside dimensions limited to approximately 8×11". These dimensions are characteristic of notebook-sized computers.

Various innovations have come about to increase the active or viewing area of the flat-panel display as a proportion of the total surface area of the top cover to obtain larger displays without increasing the computer's overall dimensions. For example, it is known to fold the driving and other peripheral circuitry around to the back of the flat-panel display. This results in a display panel whose surface area is almost entirely active except for the width of the metal rim that holds the display together and the bolt holes that are used to attach the flat-panel display to the plastic back.

BRIEF SUMMARY OF THE INVENTION

The problem with prior art configurations is the fact that they fail to recognize that the size of the top cover need not be large enough to accommodate the bolt holes. According to the present invention, the flat-panel display is provided with fixtures in the display's sidewalls to provide for its support by lateral mounting members. The advantage of this approach, in which the bolt holes are essentially rotated around to the sides of the flat-panel display, is the reduction in the portion the portable computer's top cover that is not active display. In practice, this results in an increase of six millimeters or more in the size display that may be housed in the same-sized top cover.

In specific embodiments, the lateral mounting members comprise bolts that engage bosses in the flat-panel display.

Further reductions in the inactive portions of the top cover may be achieved by extending the ends of the display's fluorescent back-light beyond or through the metal rim that surrounds the display. This allows the rim to be even thinner.

Also according to the invention, in order to accommodate the lateral mounting of the flat-panel display, metal brackets are used. These brackets extend from the base unit hinges and cradle the display. This adds torsional rigidity, but also removes the requirement that the back must be structural. As a result, the back can simply be a thin, molded cosmetic rear cover for the computer's top cover.

In specific embodiments, the lateral mounting members, or bolts, pass through the brackets and the plastic back to engage the bosses, thus binding the elements to each other.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE SEVERAL VIEWS OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE INVENTION

Figure 1:
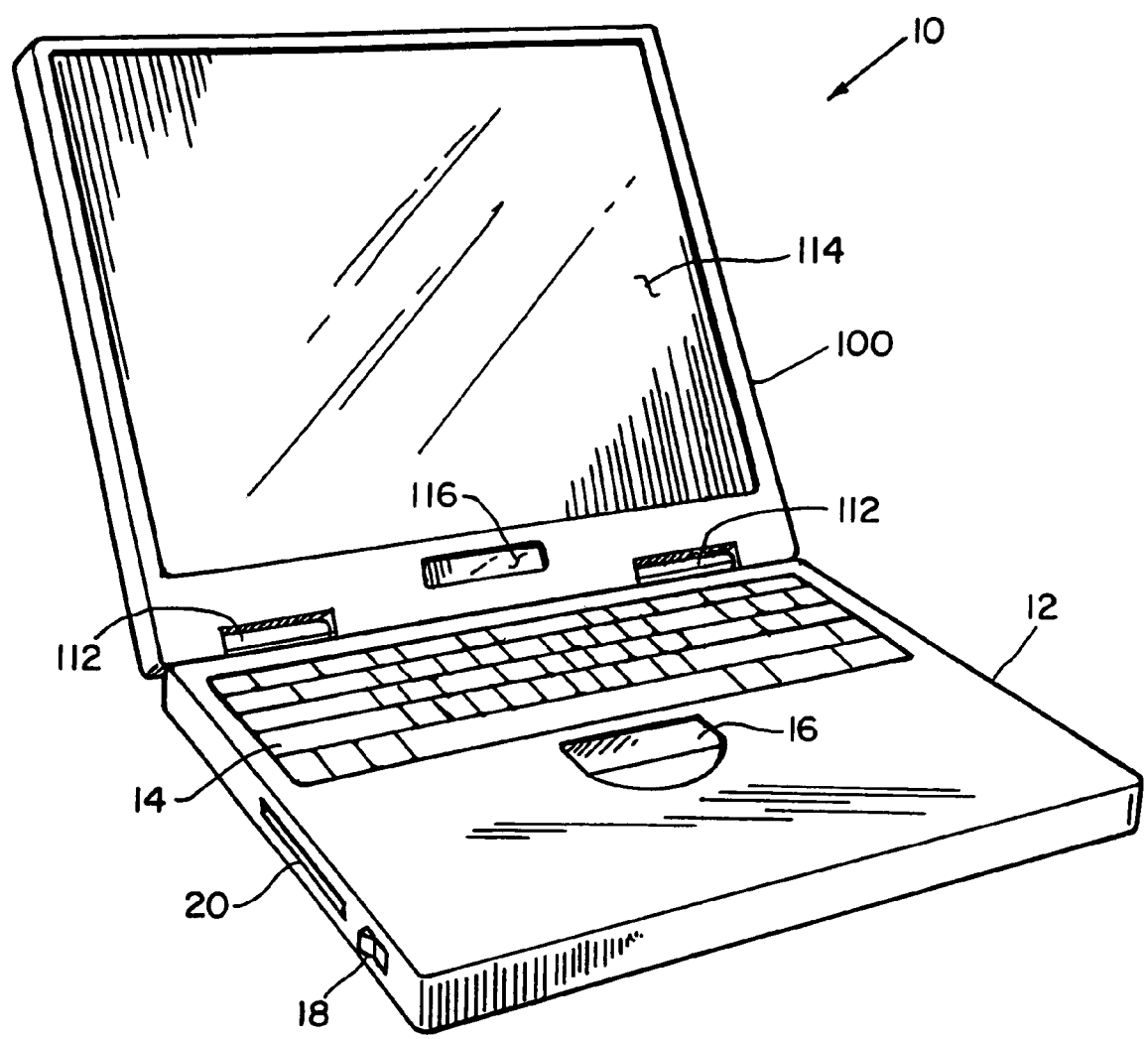
FIG. 1 is a perspective view of a portable computer according to the present invention.

FIG. 1 illustrates a personal computer 10 constructed according to the principles of the present invention. Generally, the computer 10 has a top cover 100 that is connected by hinges 112, or otherwise pivotally attached, to a base unit 12. The top cover 100 houses a flat-panel display 114 and a second, much smaller, status display 116, which typically provides information concerning remaining battery life, disk drive operation, and other house-keeping functions. The base unit 12 has keyboard 14 and a pointing device 16, a touch pad in the illustrated embodiment. A power switch 18 and disk drive door 20 are located on the side of the base unit 12.

The overall dimensions of the particular embodiment illustrated when closed are about 8.5 inches wide by 12 inches long, which dimensions also apply to the top cover 100 and base unit 12 separately. The total closed height is over two inches, with the height of the top cover 100 being approximately 0.5 inches.

The unique characteristics of the present invention are evident in the ratio between the total surface area of the top cover 100 and the surface area of the active or viewable area of the display 114. The active area of the display 114 illustrated is 14.1 inches, diagonally. Consequently, it consumes over 90% of the top cover's total area.

Figure 2:
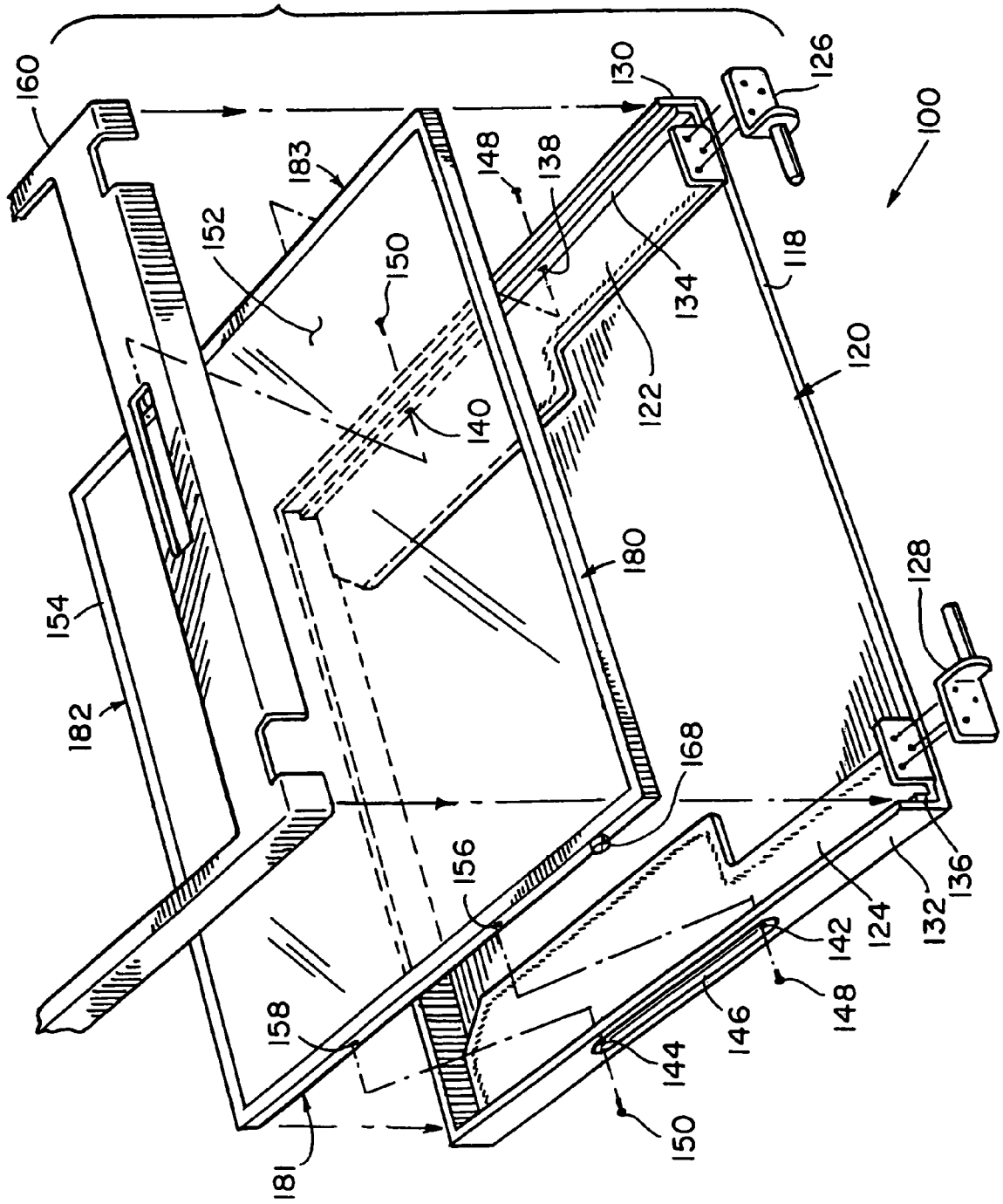
FIG. 2 is an exploded view .of the top cover of the portable computer according to the invention.

FIG. 2 illustrates the mounting technique for the display 114 in the top cover 100. Structurally, the top cover 100 comprises a back 118. This component is almost universally constructed from plastic and forms the top outer shell of the portable computer 10 when the top cover 100 is closed. The back 118 is rectangular in shape and forms essentially a tub around the other elements of the top cover 100. The proximal wall 120 of the back is not present, however, to accommodate the hinge connection to the base unit.

In many prior art designs, the back 118 of the top cover 100 provided significant structural support to the back cover. This fact was evident by the existence of spines or ridges, which are integral with the back, that added rigidity. It is also common to bolt the display to the back by placing bosses in the back during molding. In the present embodiment, only the sidewalls of the back 118 contribute to the back's bending rigidity, and the back overall has little torsional rigidity.

Rigidity, especially torsional, is added to the top cover by right and left metal brackets 122, 124 that are located in the back. The proximal portion of each bracket 122, 124 connects to respective right and left hinge elements 126, 128 that are adapted to cooperate with corresponding hinge elements in the base unit 12. The brackets 122, 124 are each aligned against respective sidewalls 130, 132 of the back 118. The cross-section of each bracket is essentially "L"-shaped, the shorter legs 134, 136 extending orthogonally away from the planar inner surface of the back 118 and abutting the back's sidewalls 130, 132. Two holes 138, 140 in each bracket are sized to accommodate bolts 148, 150, 2 millimeters in diameter, and the holes align with corresponding holes 142, 144 through the sidewalls 130, 132 of the back 118. Preferably, the outer surfaces of the back's sidewalls 130, 132 have slight depressions 146 to recess heads of the bolts 148, 150.

The flat-panel display 114 (not shown) comprises a large active area 152 that is defined by the transparent top window of the display 114. The top window is clamped to the panel's plastic back (not shown in this figure) by a metal rim 154 that extends around the display's circumference, defining the display's bottom (180), left (181), top (182), and right (183) sidewalls. Holes 156, 158, formed in the metal rim 154, align with the holes in the brackets and back when the display is installed. The four bolts 148, 150 extend through the back 118, brackets 122, 124 to engage bosses held in the display 114 behind the metal rim 154.

A plastic bezel 160 snap fits over the display onto the back. The bezel's rim extends inward hiding the display's metal rim 154.

Figure 3:
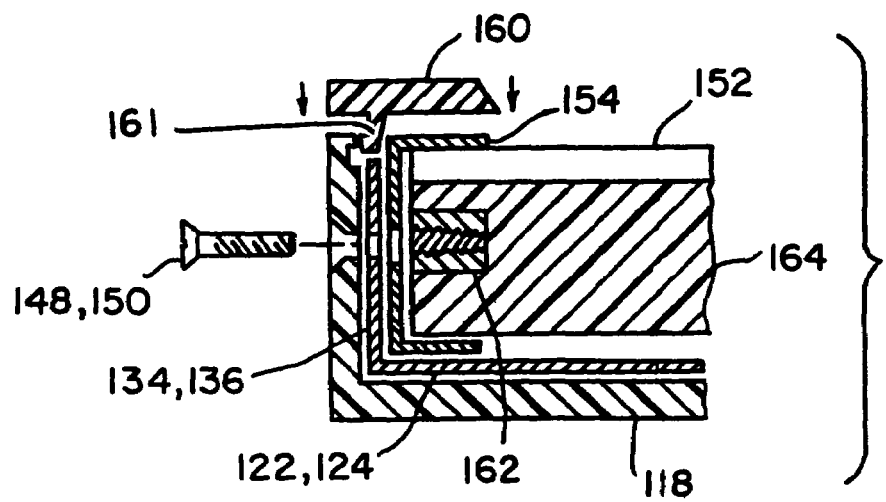
FIG. 3 is a cross-sectional view of the inventive top cover.

FIG. 3 is cross-sectional view further illustrating the back cover's construction. As discussed previously, each of the four bolts 148, 150 extends through the back 118 and corresponding vertical legs 134, 136 of the brackets 122, 124. The bolts 148, 150 further extend through the metal rim 154 of the display to engage corresponding threaded bosses 162 held in the plastic back 164 of the display. Also shown is the snap-fit arrangement 161 of the plastic bezel 160 to the back 118.

Figure 4:
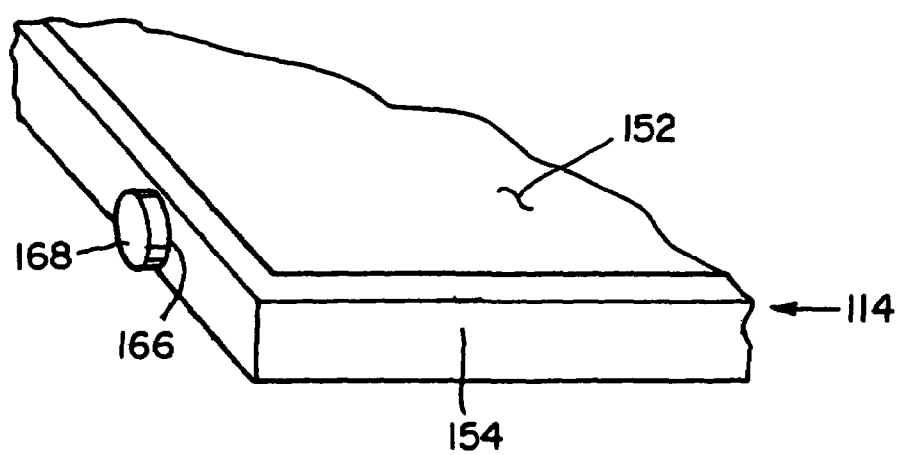
FIG. 4 is a partial perspective view of a corner of an inventive flat-panel display.

FIG. 4 is a detailed view of one of the lower outer corners of the flat-panel display 114 illustrating another innovation of the invention that enables a more compact display. Usually, the length of the fluorescent back-light plus the thickness of the display's metal rim dictate the overall width of the display. The light emitting portion of the fluorescent light must be as wide as the active area of the display, but electrodes on the end of the light are wider than the small peripheral inactive portion of the display.

According to the present invention, circular cut-outs 166 are formed in the metal rim 154 to allow the ends of the fluorescent back-light 168 to extend slightly beyond the outer surface of the metal rim 154. As a result, the overall width of the display is no wider than the critical length of the fluorescent back-light 168. In effect, twice the thickness of the metal rim 154, since cut-outs 166 are provided for both ends of the back-light 168, is removed from the overall width of the display 114 without any loss in active area. Defined another way, the inactive portions on both sides of the display 114 are each decreased by the thickness of the metal rim 154 by enabling the ends of the back-light 168 to extend beyond the rim.

In other embodiments of the invention, the bolts 148, 150 may be replaced with pins that extend through the back 118 and brackets 122, 124 to engage non-threaded holes in the sidewalls 180-183 of the display 114, possibly using an interference fit. Alternatively, these pins could be integral with the metal brackets 122, 124. In this later case, it may be desirable to have the display 114 to snap fit with the pins, to facilitate the manufacturing process.

In still another embodiment, pins extend outward from the display 114, possibly integral with the metal rim 154 to engage the brackets 122, 124 with a arrangement. This configuration has an advantage, because there is no need to accommodate holes in the display, which could affect the display's electrical design.

In still other embodiments, mounting could be accomplished off of the top and bottom sidewalls 180, 182 of the display 114. In this case, lateral mounting members that cooperate with these sidewalls would be used to replace the mounting fixtures on the right and left sidewalls 181, 183, or in addition to those fixtures.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A mounting system for a display for a computer, the mounting system comprising:

a cover for housing a portion of the display for the computer, the cover including a cover back and a wall extending around a portion of the cover back;

a bracket member including a first portion having a hole formed laterally through a portion thereof and extending along a portion of a side wall of the wall of the cover; and the display including a display panel, a display back, and a rim extending around the display panel and the display back, the display including a top side wall, a bottom side wall, a left side wall, and a right side wall, the display back having a hole formed laterally in one of the top side wall, the bottom side wall, the left side wall, and the right side wall, the display secured to a portion of the bracket member using a mounting member extending through the hole formed laterally through the first portion of the bracket member and engaging the hole formed laterally in one of the top side wall, the bottom side wall, the left side wall, and the right side wall of the display back for mounting the display to the bracket member.

2. A mounting system for a display for a computer, the mounting system having a cover for housing a portion of the display for the computer, the cover having a cover back and a wall extending around a portion of the cover back, a bracket member having a first portion having a hole formed laterally through a portion thereof and extending along a portion of a side wall of the wall of the cover, and the display including a display panel, a display back, and a rim extending around the display panel and the display back, the display including a top side wall, a bottom side wall, a left side wall, and a right side wall, the display back having a cavity formed laterally in one of the top side wall, the bottom side wall, the left side wall, and the right sidewall, the display secured to the first portion of the bracket member using a mounting member extending through the hole formed laterally through the first portion of the bracket member and having a portion extending into the cavity formed laterally in one of the top side wall, the bottom sidewall, the left sidewall, and the right side wall of the display back for mounting the display to the bracket member.

3. A mounting system for a display for a computer, the mounting system having a cover for housing a portion of the display for the computer, the cover having a cover back and a wall extending around a portion of the cover back, a bracket member having a first portion having a hole formed laterally through a portion thereof and extending along a portion of a side wall of the wall of the cover, the display including a display panel, a display back, and a rim extending round a portion of the display panel and the display back, the display including a top side wall, a bottom side wall, a left side wall, and a right side wall, the display back having a cavity formed laterally in one of the top side wall, the bottom side wall, the left side wall, and the right side wall, the display secured to the first portion of the bracket member using a mounting member extending through the hole formed laterally through the first portion of the bracket member and having a portion extending into the cavity formed laterally in one of the top side wall, the bottom side wall, the left side wall, and the right side wall of the display back for mounting the display to the bracket member, and a bezel having a portion covering a portion of the display.

4. A mounting system for a display for a computer, the mounting system having a cover for housing a portion of the display for the computer, the cover having a cover back and a wall extending around a portion of the cover back, a bracket member having a first portion having a hole formed laterally through a portion thereof and extending along a portion of a side wall of the wall of the cover, the display including a display panel, a display back, and a rim extending around a portion of the display panel and the display back, the display including a top side wall, a bottom side wall, a left side wall, and a right side wall, the display back having a cavity formed laterally in one of the top side wall, the bottom side wall, the left side wall, and the right side wall, the display secured to the first portion of the bracket member using a mounting member extending through the hole formed laterally through the first portion of the bracket member and having a portion extending into the cavity formed laterally in one of the top side wall, the bottom side wall, the left side wall, and the right side wall of the display back for mounting the display to the bracket member, and a bezel having a portion covering a portion of the display, the bezel having a portion for abutting a portion of a side wall of the wall of the cover.

5. An assembly for mounting a flat-panel display comprising:
a bracket member including a first portion for mounting a flat-panel display in a cover, the cover including a cover back and a wall extending around a portion of the cover back, the bracket member having a hole formed laterally through the first portion thereof and extending along a portion of the wall of the cover; and the flat-panel display including a display panel, a back, and a rim extending around the display panel and the back, the flat-panel display including a plurality of side walls, the flat-panel display having a hole formed laterally in the rim and one of the plurality of side walls of the back thereof, the flat-panel display secured to the first portion of the bracket member using. a mounting member extending through the hole formed laterally through the first portion of the bracket member and into the hole formed laterally in the rim and one of the plurality of side walls of the back of the flat-panel display for mounting the flat-panel display to the bracket member.

6. A mounting system for a display for a computer, the mounting system having a cover for housing a portion of the display for the computer, the cover having a cover back and a wall extending around a portion of the cover back, a bracket member having a first portion extending in a first direction and a hole formed laterally therethrough, the display including a display panel, a display back, and a rim extending around a portion of the display panel and the display back, the display including a top side wall, a bottom side wall, a left side wall, and a right side wall, the display having a hole formed in the rim and having a recess formed laterally in the display back in one of the top side wall, the bottom side wall, the left side wall, and the right side wall, the display secured to the first portion of the bracket member using a mounting member extending through the hole formed laterally through the first portion of the bracket member, having a portion extending through the hole in the rim, and having a portion extending into the recess formed laterally in the display back in one of the top side wall, the bottom side wall, the left side wall, and the right side wall of the display for mounting the display to the bracket member.

7. A mounting system for a display for a computer, the mounting system having a cover for housing a portion of the display for the computer, the cover having a cover back and a wall extending around a portion of the cover back, a bracket member having a first portion extending in a first direction having a bole formed laterally therethrough, the display including a display panel, a display back, and a rim extending around a portion of the display panel and the display back, the display including a top side wall, a bottom side wall, a left side wall, and a right side wall, the display having a hole formed through the rim and a recess formed laterally in the display back in one of the top side wall, the bottom side wall, the left side wall and the right side wall, the display secured to the first portion of the bracket member using a mounting member extending through the hole formed laterally through the first portion of the bracket member, through the hole in the rim, and having a portion extending into the recess formed laterally in the display back in one of the top side wall, the bottom side wall, the left side wall, and the right side wall of the display for mounting the display to the bracket member, and a bezel, a portion of the bezel covering at least a portion of the display panel of the display.

8. A mounting system for a display for a computer, the mounting system having a cover for housing a portion of the display for the computer, the cover having a cover back and a wall extending around a portion of the cover back, a bracket member having a first portion extending in a first direction having a hole formed laterally therethrough, the display including a display panel, a display back, and a rim extending around a portion of the display panel and the display back, the display including a top side wall, a bottom side wall, a left side wall, and a right side wall, the display having a hole formed through the rim and a recess formed laterally in the display back in one of the top side wall, the bottom side wall, the left side wall and the right side wall, the display secured to the first portion of the bracket member, using a mounting member extending through the hole formed laterally through the first portion of the bracket member, through the hole in the rim, and having a portion extending into the recess formed laterally in the display back in one of the top side wall, the bottom side wall, the left side wall, and the right side wallof the display for mounting the, display to the bracket member, and a bezel, a portion of the bezel covering at least a portion of the display panel of the display, the bezel having a portion for abutting a portion of a side wall of the wall of the cover.

9. A mounting system for a display for a computer having a cover for housing a portion of the display for the computer and a base unit, the cover and the base unit having the same dimensions, the cover having a cover back and a wall extending around a portion of the cover back, a bracket member having a first portion having a hole formed laterally through a portion thereof and extending along a portion of a side wall of the wall of the cover, and the display having a display panel, a display back, and a rim extending around the display panel and the display back, the display having a top side wall, a bottom side wall, a left side wall, and a right side wall, the display having a hole formed laterally in the display back in one of the top side wall, the bottom side wall, the left side wall, and the right side wall, the display secured to a portion of the bracket member using a mounting member extending through the hole formed laterally through the first portion of the bracket member and into a portion of the hole formed laterally in the display back in one of the top side wall, the bottom side wall, the left side wall, and the right side wall of the display for mounting the display to the bracket member.

10. A display mounting system for a display for a computer having a rectangular base unit having two long sides and two short sides comprising:
    a bracket member having a first portion for mounting the display in a rectangular cover having two long sides and two short sides having the same dimension as the two long sides and two short sides of the rectangular base unit, a long side of the cover pivotally attached adjacent a long side of the rectangular base unit, the cover including a cover back and a wall extending around a portion of the cover back, the bracket member having a hole formed laterally through a first portion thereof; and
    the display including a display panel, a display back, and a rim extending around the display panel and the display back, the display including a left side wall and a right side wall, the display having a hole formed laterally in the display back in one of the left side wall and the right side wall, the display secured to a portion of the first portion of the bracket member using a mounting member extending through the hole formed laterally through the first portion of the bracket member and into a portion of the hole in one of the left side wall and the right side wall of the display back of the display for mounting the display to the first portion of the bracket member.

11. An assembly for mounting a display for a computer having a rectangular base unit comprising:
    a bracket member including a first portion for mounting the display in a cover having the same dimensions as the rectangular base unit, the cover including a cover back and a wall extending around a portion of the cover back, the bracket member having a hole formed laterally through the first portion thereof; and
    the display including a display panel, a back, and a rim extending around the display panel and the back, the display including a plurality of side walls, one of the plurality of side walls having a hole formed laterally therein, the display secured to the first portion of the bracket member using a mounting member extending through the hole formed laterally through the first portion of the bracket member and into a portion of the hole formed laterally in one of the plurality of side walls of the display for mounting the display to the bracket member.

12. A mounting system for a display for a computer having a base unit having a length and a width, the mounting system comprising:
    a cover for covering the base unit having the same length and width as the base unit and for housing a portion of the display for the computer, the cover including a cover back and a wall extending around a portion of the cover back;
    a bracket member including a first portion having a hole formed laterally through a portion thereof; and
    the display including a display panel, a display back, and a rim extending around the display panel and the display back, the display including a top side wall, a bottom side wall, a left side wall, and a right side wall, the display having a hole formed laterally in the display back in one of the top side wall, the bottom side wall, the left side wall, and the right side wall, the display secured to a portion of the bracket member using a mounting member extending through the hole formed laterally through the first portion of the bracket member and into the hole formed laterally in the display back in one of the top side wall, the bottom side wall, the left side wall, and the right side wall of the display back of the display for mounting the display to the bracket member.

13. A display mounting system for a display for a computer having a base unit having a length and a width comprising:
    a bracket member having a first portion for mounting the display in a cover having a length and a width the same as the base unit and having a removable bezel attached thereto, the cover having a cover back and a wall extending around a portion of the cover back, the bracket member having a hole formed laterally through a first portion thereof and extending along a portion of the wall of the cover; and
    the display including a display panel, a display back, and a rim extending around the display panel and the display back, the display including a left side wall and a right side wall, the display having a hole formed laterally in the display back in one of the left side wall and the right side wall, the display secured to a portion of the first portion of the bracket member using a mounting member extending through the hole formed laterally through the first portion of the bracket member and into a portion of the hole formed laterally in the display back in one of the left side wall and the right side wall of the display for mounting the display to the first portion of the bracket member.

14. An assembly for mounting a display for a computer having a base unit comprising:
    a bracket member including a first portion for mounting the display in a cover having the same dimensions as the base unit of the computer for the base unit to be covered thereby, the cover including a cover back and a wall extending around a portion of the cover back, the bracket member having a hole formed laterally through the first portion thereof; and the display including a display panel, a back, and a rim extending around the display panel and the back, the display including a plurality of side walls, one of the plurality of side walls having a cavity formed laterally therein, the display secured to the first portion of the bracket member using a mounting member extending through the hole formed laterally through the first portion of the bracket member and into a portion of the cavity formed laterally in one of the plurality of side walls of the display for mounting the display to the bracket member.

15. A mounting system for a display for a computer having a base unit, the mounting system comprising:

a cover for housing a portion of the display for the computer, the cover having the same dimensions as the base unit and including a cover back having a wall extending around a portion of the cover back;

a bracket member including a first portion having a hole formed laterally through a portion thereof; and the display including a display panel, a display back, and a rim extending around the display panel and the display back, the display including a top side wall, a bottom side wall, a left side wall, and a right side wall, the display back having a cavity formed laterally in one of the top side wall, the bottom side wall, the left side wall, and the right side wall, the display secured to a portion of the bracket member using a mounting member extending through the hole formed laterally through the first portion of the bracket member and into the cavity formed laterally in one of the top side wall, the bottom side wall, the left side wall, and the right side wall of the display back for mounting the display to the bracket member.

16. A display mounting system for a display for a computer having a rectangular base unit having adjacent sides of unequal length comprising:

a bracket member having a first portion for mounting the display in a cover, the cover pivotally attached to the base unit adjacent a longer side thereof, the cover including a cover back and a wall extending around a portion of the cover back, the bracket member having a hole formed laterally through a first portion thereof; and the display including a display panel, a display back, and a rim extending around the display panel and the display back, the display including a left side wall and a right side wall, the display back having a hole formed laterally in one of the left side wall and the right side wall, the display secured to a portion of the first portion of the bracket member using a mounting member extending through the hole formed laterally through the first portion of the bracket member and into a portion of the hole in one of the left side wall and the right side wall of the display back for mounting the display to the first portion of the bracket member.

17. An assembly for mounting a display having a back for a computer having a rectangular base unit having a keyboard extending from near one short side of the rectangular base unit to near another short side of the rectangular base unit and extending near a long side of the rectangular base unit comprising:

a bracket member including a first portion for mounting the display in a cover having the same size as the rectangular base unit, the cover pivotally attached along the long side of the rectangular base unit having the keyboard extending therealong, the cover including a cover back and a wall extending around a portion of the cover back, the bracket member having a hole formed laterally through the first portion thereof; and the display including a display panel, a back, and a rim extending around the display panel and the back, the display including a plurality of side walls, the back having a recess formed in one of the plurality of side walls, the display secured to the first portion of the bracket member using a mounting member extending through the hole formed laterally through the first portion of the bracket member and into a portion of the recess formed in one of the plurality of side walls in the back of the display for mounting the display to the bracket member.

18. An assembly used for mounting a display for a computer comprising:

a bracket member having a first portion for mounting a display in a cover, the cover having a cover back and a wall extending around a portion of the cover back, the bracket member having a hole formed laterally through the first portion thereof; and the display including a display panel, a back, and a rim having a hole formed laterally therein and extending around the display panel and the back, the display including a plurality of side walls, one of the side walls having a hole formed laterally therein, the display secured to the first portion of the bracket member using a mounting member extending through the hole formed laterally through the first portion of the bracket member, through the hole in the rim, and into the bole formed laterally in one of the side walls of the display for mounting the display to the bracket member.

* * * * *